United States Patent
Neidhöfer et al.

(10) Patent No.: US 12,514,367 B2
(45) Date of Patent: Jan. 6, 2026

(54) CARRIAGE FOR A LINEAR GUIDE SYSTEM AND A LINEAR GUIDE SYSTEM COMPRISING SUCH A CARRIAGE

(71) Applicant: Accuride International GmbH, Diez (DE)

(72) Inventors: Patrick Neidhöfer, Seelbach (DE); Thomas Quirein, Diez (DE)

(73) Assignee: Accuride International GmbH, Diez (DE)

(*) Notice: Subject to any disclaimer, the term of this patent is extended or adjusted under 35 U.S.C. 154(b) by 267 days.

(21) Appl. No.: 18/231,877

(22) Filed: Aug. 9, 2023

(65) Prior Publication Data
US 2024/0052885 A1 Feb. 15, 2024

(30) Foreign Application Priority Data
Aug. 12, 2022 (DE) .................... 10 2022 120 440.5

(51) Int. Cl.
*A47B 88/483* (2017.01)
*A47B 88/487* (2017.01)

(52) U.S. Cl.
CPC .......... *A47B 88/483* (2017.01); *A47B 88/487* (2017.01)

(58) Field of Classification Search
CPC ............................ A47B 88/483; A47B 88/487
See application file for complete search history.

(56) References Cited

U.S. PATENT DOCUMENTS

| | | | | |
|---|---|---|---|---|
| 8,752,917 | B1* | 6/2014 | Chang ................. | A47B 88/487 312/334.47 |
| 2001/0054863 | A1* | 12/2001 | Uchino ................ | A47B 88/487 312/334.7 |
| 2006/0062498 | A1* | 3/2006 | Santaolalla Gil .......... | B60J 7/02 384/42 |
| 2016/0084309 | A1* | 3/2016 | Park ....................... | F16C 33/40 384/49 |
| 2019/0069672 | A1* | 3/2019 | Pan ...................... | A47B 88/467 |
| 2019/0239645 | A1* | 8/2019 | Stöckli ................. | A47B 88/467 |
| 2024/0052884 | A1* | 2/2024 | Neuhaus ............... | A47B 88/487 |
| 2024/0358152 | A1* | 10/2024 | Neuhaus ............... | F16C 29/002 |

FOREIGN PATENT DOCUMENTS

| | | |
|---|---|---|
| DE | 4242475 A1 | 6/1994 |
| WO | 2021/209301 A1 | 10/2021 |

OTHER PUBLICATIONS

Search Report received for DE Application No. 102022120440.5, mailed on May 17, 2023, 9 pages (Original Document Only).

* cited by examiner

*Primary Examiner* — Daniel J Rohrhoff
(74) *Attorney, Agent, or Firm* — MEDLER FERRO WOODHOUSE & MILLS PLLC

(57) ABSTRACT

A carriage for a linear guide system includes a rail element including two running surfaces facing each other and the carriage being movable relative to the rail element in and against a pull-out direction. The carriage includes a base body, a pair of first and second sliders having sliding surfaces facing away from each other, wherein the sliding surface of the first and second slider is frictionally engageable with a respective one of the running surfaces, and wherein the first slider is mounted on the base body for movement relative to the base body in an upward direction perpendicular to the pull-out direction, and a spring member, wherein the spring member is mounted on the base body such that the spring member biases the first slider in the upward direction away from the second slider.

16 Claims, 4 Drawing Sheets

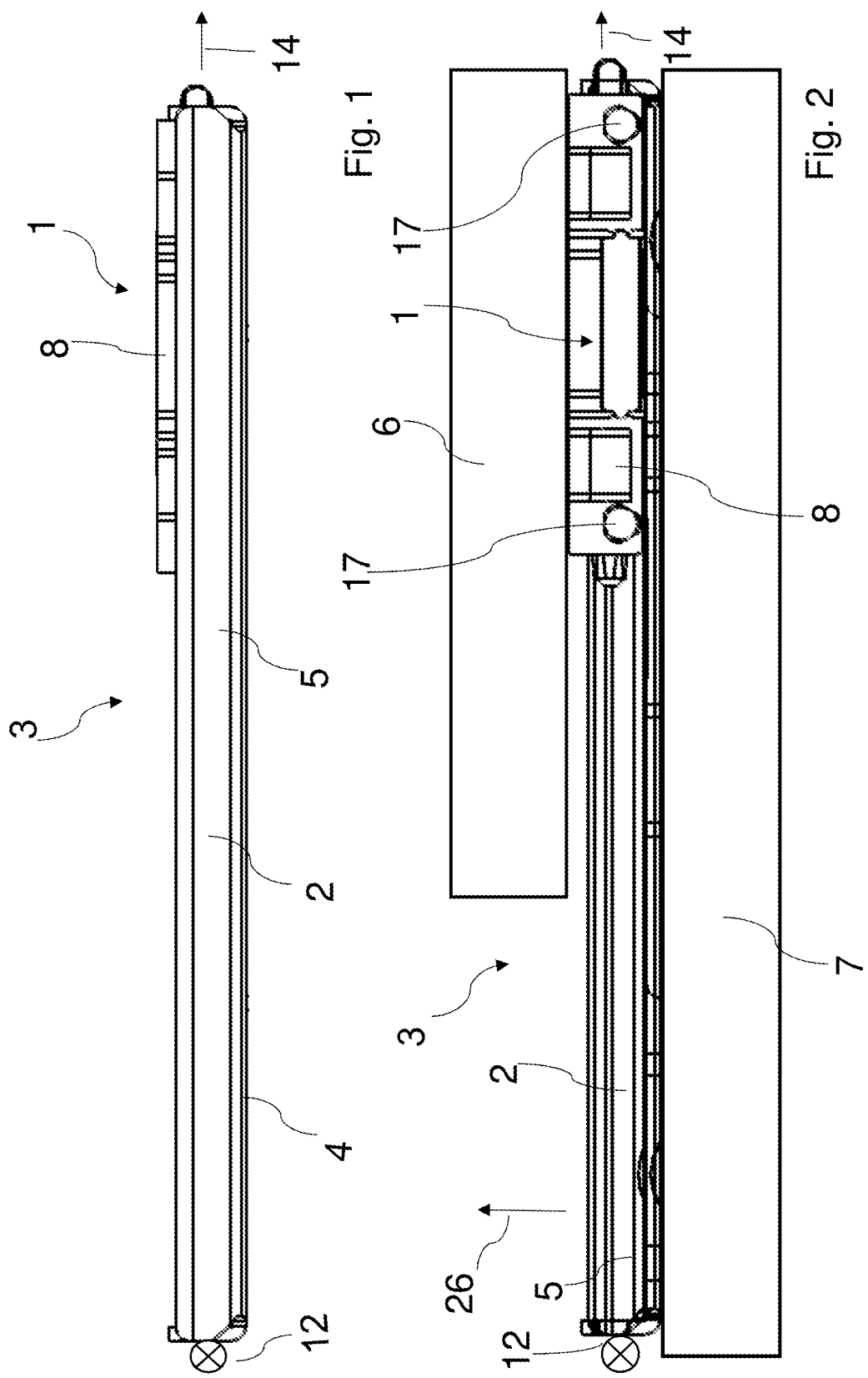

CARRIAGE FOR A LINEAR GUIDE SYSTEM AND A LINEAR GUIDE SYSTEM COMPRISING SUCH A CARRIAGE

The application claims priority of German patent application no. 10 2022 120 440.5, filed on Aug. 12, 2022, which is incorporated by reference herein in its entirety.

The present invention relates to a carriage for a linear guide system, wherein the linear guide system comprises a rail element comprising two running surfaces facing towards each other and the carriage movable relative to the rail element in and against a pull-out direction, the carriage comprising: a base body, a pair of first and second sliders having sliding surfaces facing away from each other, wherein the sliding surfaces of the first and second sliders are frictionally engageable with a respective one of the running surfaces, and wherein the first slider is supported on the base body for movement relative to the base body in an upward direction perpendicular to the pull-out direction, and a spring member, wherein the spring member is supported on the base body such that the spring member biases the first slider away from the second slider in the upward direction.

The present invention also relates to a linear guide system comprising such a carriage and a rail element, wherein the rail element comprises two running surfaces facing each other, wherein the carriage and the rail element are linearly displaceable relative to each other in and against the pull-out direction, and wherein the first and the second slider are each frictionally engaged with one of the running surfaces of the rail element.

Linear guide systems with a carriage and a rail element, wherein rolling bodies arranged on the carriage are provided between the carriage and the running surfaces of the rail element, are known from the prior art. They are used in various household appliances, but also in automotive engineering and many other fields of application. In order to enable the carriage to be displaced with as little friction as possible relative to the rail element, rolling bodies are arranged between the rail element and the carriage, wherein the rolling bodies roll on the surface of the running surfaces of the rail element or execute a sliding movement relative to the surface of the running surfaces during a relative movement of the carriage and the rail element. The resulting rolling and/or sliding friction is less than a direct sliding friction between the carriage and the rail element. However, in such a design of a linear guide system, it is difficult to precisely adjust the force necessary to move the carriage relative to the rail element. Moreover, the position of the carriage relative to the rail element cannot be precisely defined by the rolling bodies.

Therefore, a modified carriage for a linear guide system of the kind mentioned at the beginning as well as a linear guide system with such a carriage and a rail element are known from WO 2021/209301 A1.

In contrast, the object of the present invention is to provide a carriage for a linear guide system which has a further reduced clearance relative to the rail element.

To solve this object, a carriage for a linear guide system according to independent claim 1 of the present application is proposed. For this purpose, at least the base body or the first slider of the carriage of the type mentioned at the beginning additionally comprises a clearance reducing means. According to the invention, this clearance reducing means is designed in such a way that the first slider is mounted on the base body in a substantially clearance-free manner, so that at least a rotational movement of the base body relative to the slider about an axis of rotation parallel to the upward direction is blocked by the clearance reducing means, or a rotational movement of the base body relative to the slider about an axis of rotation perpendicular to the upward direction and to the pull-out direction is blocked by the clearance reducing means.

In the first place, the present invention relates to such a carriage for a linear guide system irrespective of the design of the rail element necessary for the linear guide system.

For the purposes of the present application, the pull-out direction denotes the direction in and against which the carriage is linearly displaceable relative to the rail element when mounted on the rail element. If a coordinate system is placed in the linear guide system, the pull-out direction is defined as the X-axis of such a coordinate system.

For the purposes of the present application, the upward direction is understood to be a direction perpendicular to the pull-out direction and extending substantially parallel to a rail back of the rail element. In other words, the upward direction is parallel to the spring force exerted by the spring element on the first slider. The upward direction connects the first and second sliders of the pair of sliders. Here, the term upward direction is used independently of the installation position of the linear guide system, i.e. the orientation of the rail back. In the above coordinate system, the upward direction defines the Y-axis.

A third axis, arranged perpendicular to the upward direction and perpendicular to the pull-out direction, defines the Z-axis of the above coordinate system. It is understood that this Z-axis is oriented substantially perpendicular to the back of the rail.

It has been found that known carriages for a linear guide system, after the carriage and the rail element have been assembled, tend to allow a tilting or pivoting movement of the base body with respect to the first and second sliders in contact with the running surfaces of the rail element when torques are applied to the base body. Such clearance, which allows rotational movement of the carriage about the upward direction or about an axis of rotation perpendicular to the upward direction and to the pull-out direction, may have acoustic and haptic disadvantages for the user of a linear guiding system.

The measures known from the prior art are dedicated to the object of compensating for a possible rotational movement between the base body and the sliders, i.e. in the installed state between the base body and the rail element, by providing additional support for the base body on the rail element. In contrast, the idea underlying the present invention is to reduce the clearance of at least the base body relative to at least the first slider, preferably relative to the first and second sliders. For this purpose, a clearance reducing means is provided on the base body or on at least the first slider or on both or on the base body and the first and second sliders.

According to the invention, the clearance reducing means specifically serves to block rotational movements of the base body relative to the slider about an axis of rotation parallel to the upward direction (Y-axis) and/or about an axis of rotation perpendicular to the upward direction (Y-axis) and the pull-out direction (X-axis) (such an axis of rotation is parallel to the Z-axis).

In principle, it would be desirable to reduce the clearance by means of the clearance reducing means in such a way that rotational movements of the base body relative to the slider are blocked both about the axis of rotation parallel to the upward direction and about the axis of rotation perpendicular to the upward direction and the pull-out direction.

However, such blocking of rotational or pivotal movements of the base body relative to the first and/or second slider about both said rotational axes may lead to a failure of the linear mobility of the first/second slider relative to the base body in the upward direction. Therefore, in an embodiment of the invention, the clearance reducing means is configured to block without clearance only a rotational movement of the base body relative to the slider about an axis of rotation parallel to the upward direction, or to block without clearance a rotational movement of the base body relative to the slider about an axis of rotation perpendicular to the upward direction and to the pull-out direction, while a linear movement of the slider relative to the base body in the upward direction remains possible.

In an embodiment of the invention, the clearance reducing means is configured such that either the first and/or second slider has less clearance relative to the base body in the pull-out direction than in a direction perpendicular to the pull-out direction and to the upward direction, or else the first and/or second slider has less clearance relative to the base body in the direction perpendicular to the pull-out direction and to the upward direction than in the pull-out direction.

In an embodiment, the choice of completely blocked or at least more restricted rotational movement depends on the installation position of the linear guide system. A linear guide system is said to be installed vertically if the back of the rail element is oriented substantially vertically. The upward direction of the slider is then also vertical. In such an installation position, it is advantageous if a rotational movement about an axis of rotation perpendicular to the upward direction and to the pull-out direction is blocked.

One speaks of a horizontal installation position when the rail back of the rail element is oriented essentially horizontally. In such an installation position, the upward direction of the carriage is then also essentially horizontal. In such an installation position, it is useful if a rotational movement of the base body relative to the slider about the upward direction, in particular only about the upward direction, is completely blocked or at least more restricted.

The first and the second slider are components which, due to their geometric design and/or their mounting or fixing to the base body, can only slide with their sliding surfaces on the running surfaces of the rail element, but cannot roll. An example of such a slider is a component with a cylindrical or part-cylindrical surface forming the sliding surface, wherein the cylinder axis is substantially aligned in the pull-out direction of the carriage. It is understood that such a cylindrical sliding surface can slide on, but not roll on, the respective running surface when oriented as indicated. Another example of a slider is a component having a polygonal cross-sectional area viewed in a cross-sectional plane perpendicular to the direction of extension. For example, the slider may have sliding surfaces arranged in a V-shape which, when assembled, are in contact with the running surface of the rail element.

In an embodiment of the invention, the second slider of the pair is also mounted on the base body so as to be movable in the upward direction perpendicular to the pull-out direction relative to the base body. A spring element then also biases the second slider away from the first slider and towards one of the running surfaces of the rail element when installed.

In an embodiment of the invention, the first slider and the second slider form a functional unit, as exactly one spring element biases the first and second sliders away from each other and thus towards the two running surfaces of the rail element. In this way, a defined frictional force is provided between the carriage, namely the sliding surfaces of the first and second sliders and the running surfaces of the rail element.

In an embodiment of the invention, the first and second sliders and the spring element are floatingly mounted on the base body in the upward direction. This means that the spring element, preferably the exact one spring element, is supported in the upward direction exclusively on the first and the second slider, but not on the base body of the carriage. In this way, the spring force exerted on the two sliders is independent of the exact position of the base body in the upward direction. In particular, in an embodiment, the spring force exerted on the two sliders is equal.

In an embodiment of the invention, the first slider and the second slider are each biased towards the respective running surfaces by a separate spring element. In such an embodiment, the spring elements are supported on the base body or on each other.

In an embodiment of the invention, the spring element is a coil spring.

In an embodiment of the invention, the first and/or the second slider are made of plastic, preferably by injection moulding. In an embodiment of the invention, the base body is made of metal or of plastic, preferably by injection moulding.

In an embodiment of the invention, the first slider comprises an elongated friction jaw extending in the pull-out direction, wherein the friction jaw has two side surfaces extending preferably parallel to the pull-out direction, two end surfaces extending preferably parallel to the upward direction, and to the sliding surface. In an embodiment of the invention, the sliding surface is a part of a cylinder surface.

It is understood that in an embodiment of the invention, the first and second sliders are identically configured. Therefore, when embodiments and designs of the first slider are described in detail in the present application, they also describe embodiments of the second slider.

In an embodiment of the invention, the friction jaw—optionally apart from one or more guiding pins—has a T-shaped configuration. In this case, the transverse beam of the T-shape supports the sliding surface. The vertical bar of the T-shape, on the other hand, serves to accommodate the spring element. If the spring element is a coil spring, the vertical bar of the T-shape extends in an embodiment into the interior of the coil spring.

Embodiments of the clearance reducing means according to the invention are described below. It is understood that in an embodiment of the invention, a plurality of clearance reducing means may be provided on the base body and/or on the first slider and/or on the second slider. In particular, in an embodiment of the invention, a clearance reducing means or a part thereof is also provided on the second slider.

In an embodiment of the invention, the clearance reducing means for each of the first and/or second slider comprises two guide slots on the base body, wherein each guide slot has two contact surfaces extending preferably parallel to the pull-out direction, which are in frictional contact with the side surfaces or portions of the side surfaces of the friction jaw.

In an embodiment of the invention, one of the contact surfaces of the two guide slots is in contact with one of the side surfaces of the friction jaw over a guide length, wherein the guide length is at least 20 percent of an overall length of the friction jaw in the pull-out direction.

In an embodiment of the invention, as an alternative or in addition to the guide slots, a clearance reducing means is provided comprising two rail ribs extending in the upward direction and a guiding rib extending in the upward direction. Either the two rail ribs are arranged on one of the end faces of the friction jaw and the guiding rib is arranged on a support surface of the base body facing the end face, or the guiding rib is arranged on one of the end faces of the friction jaw and the two rail ribs are arranged on the support surface of the base body facing the end face. The guiding rib and the two rail ribs extend parallel to each other, wherein the guiding rib is in contact with the two rail ribs.

In an embodiment of the invention, the guiding rib and the two rail ribs have substantially rectangular, for example square, cross-sectional planes in a cross-sectional plane perpendicular to the upward direction. Two side surfaces of the guiding rib are then in planar contact with two side surfaces of the rail ribs facing each other, and the guiding rib slides between the rail ribs in the upward direction.

In an alternative embodiment, the guiding rib and the two rail ribs each have a part-circular cross-section in the cross-sectional plane perpendicular to the upward direction. In an embodiment of the invention, the radii of the part-circular cross-sections of the guiding rib and the two rail ribs are matched such that the guiding rib and each of the two rail ribs contact each other only tangentially. A substantially linear contact is then formed between a surface of the guide rail and each of the surfaces of the two rail ribs.

In an embodiment, two rail ribs and one guiding rib are provided on each side of the friction jaw.

In one embodiment of the invention, the first and/or second slider comprises an elongate friction jaw extending in the pull-out direction and at least one guiding pin extending from the friction jaw in the upward direction, wherein the guiding pin engages a guiding bush in the base body complementary to the guiding pin, such that the first slider is supported for movement in the upward direction relative to the base body.

In an embodiment of the invention, the guiding pin is cylindrical and has a circular cross-sectional area. In an embodiment, the guiding bush is complementarily configured with the guiding pin as a hollow cylinder. Other cross-sectional shapes of the guiding pin and the guiding bush are also conceivable, as long as the guiding pin and the guiding bush are complementary to each other.

In an embodiment of the invention, the first slider comprises two, preferably exactly two, guiding pins extending from the friction jaw in the upward direction, wherein each of the guiding pins engages in a guiding bush in the base body complementary to the respective guiding pin. In an embodiment of the invention, the two guiding pins are symmetrically arranged on the friction jaw.

In an embodiment, the clearance reducing means is formed as an element at least on the at least one guiding pin or at least on the guiding bush.

In an embodiment, the element is configured such that the combination of the guiding pin and the guiding bush either has less clearance in the pull-out direction than in a direction perpendicular to the pull-out direction and the upward direction, or has less clearance in the direction perpendicular to the pull-out direction and to the upward direction than in the pull-out direction. If the clearance between the guiding pin and the guiding bush is less in the pull-out direction than in the direction perpendicular to the pull-out direction and to the upward direction, rotational movement about an axis of rotation perpendicular to the upward direction and to the pull-out direction is blocked. If the clearance between the guiding pin and the guiding bush is less in the direction perpendicular to the pull-out direction and to the upward direction than in the pull-out direction, a rotational movement of the base body relative to the slider about an axis of rotation parallel to the upward direction is blocked.

Such a reduction of clearance can be achieved, for example, by reducing the free cross-section of the guiding bush in one of the two directions compared to the other direction. In such an embodiment, the element of the clearance reducing means is a wall portion of the guiding bush. For example, it is possible to design the guiding bush as an elongated hole. A variant in which the clearance between the guiding pin and the guiding bush is reduced in only one of the two directions specifically blocks a rotational movement of the base body relative to the slider about one of the two directions or axes, while at the same time not excessively increasing the friction between the guiding pin and the guiding bush.

In an embodiment of the invention, the element of the clearance reducing means is a squeeze web disposed on a surface of the guiding pin or a surface of the guiding bush, protruding from the surface and extending in the upward direction, which reduces the clearance between the guiding pin and the guiding bush. In particular, an embodiment is preferred in which the surface apart from the squeeze web of both the guiding pin and the guiding bush is cylindrical or hollow cylindrical. A squeeze web in the sense of the present invention extends in the upward direction and protrudes from the respective surface of the guiding pin or guiding bush in the radial direction. In an embodiment, the squeeze web has an oversize in the sense that the squeeze web is larger than the gap between the guiding pin and the guiding bush without the squeeze web.

In an embodiment of the invention, such a squeeze web is elastically deformable. In this way, a reduction of the clearance is effected without at the same time excessively increasing the friction.

In an embodiment of the invention, the element of the clearance reducing means comprises two, preferably exactly two, squeeze webs arranged on the surface of the guiding pin or the guiding bush, projecting with respect to the surface and extending in the upward direction, wherein preferably the squeeze webs are arranged diametrically opposite each other on the surface.

Moreover, in an embodiment of the invention, the guiding between the guiding pin and the guiding bush is maximised in the upward direction. In an embodiment of the invention, the guiding pin extends over a guiding length in the upward direction in the guiding bush, wherein the guiding length is at least 15 percent of the extent of the base body in the upward direction. In this context, the guide length is the overlap between the guiding pin and the guiding bush when the guiding pin is fully inserted into the guiding bush.

In an embodiment of the invention, at least the base body or the first slider has two clearance reducing means, wherein the two clearance reducing means are spaced apart in the pull-out direction, wherein the spacing is at least 50 percent, preferably at least 60 percent, of a total extension of the friction jaw in the pull-out direction. It has been shown that the greatest possible distance between two clearance reducing means, in particular when the two clearance reducing means block a rotary movement about the same axis of rotation, leads to increased stability of the base body with respect to applied torques.

In an embodiment of the invention, an extension of the friction jaw in the pull-out direction is at least 35 percent, preferably at least 40 percent and more preferably at least 50 percent of a total extension of the base body in the pull-out direction. It has been shown that maximising the extension of the friction jaw in the pull-out direction relative to the total extension of the base body in the pull-out direction contributes to stabilising rotational movements of the base body relative to the slider.

In addition to the first and second sliders of the pair of sliders, in an embodiment of the invention support elements are received on the base body. In an embodiment, these support elements are biased away from each other, i.e. towards the running surfaces of the rail element in the installed state, in the same way as the first and second sliders. Such support elements can be, for example, further sliders or also rolling bodies, for example balls.

Therefore, in an embodiment, the carriage comprises a plurality of rolling bodies, wherein the plurality of rolling bodies is accommodated on the base body such that the plurality of rolling bodies are rollable at least on the two running surfaces or perform a sliding movement relative to the two running surfaces, and that the plurality of rolling bodies is spaced apart from the first slider or the second slider in the pull-out direction, wherein the base body determines a position of each of the plurality of rolling bodies in the pull-out direction relative to the base body. As stated above, in an embodiment the rolling bodies are biased away from each other, i.e. towards the running surfaces of the rail element. The rolling bodies are support elements in the language of the present application.

In an alternative embodiment of the invention, the support elements are also sliders. Thereby, in an embodiment of the invention, the sliders of the support elements have an identical design as the first and/or the second slider.

In an embodiment of the invention, the carriage comprises a first pair of support elements and a second pair, preferably exactly one first pair and exactly one second pair, of support elements. In this case, the support elements of one pair are in contact with the opposite running surfaces of the rail element. In an embodiment of the invention, the support elements of the first and the second pair of support elements have the same distance in the pull-out direction from the first slider and the second slider, respectively. Then the first and second sliders are symmetrically arranged between two support elements, preferably between two rolling bodies.

In an embodiment of the invention, a detent body and a detent spring are additionally provided on the carriage, wherein the detent spring biases the detent body in a direction perpendicular to the pull-out direction and in the upward direction or perpendicular to the upward direction. Such a detent body engages a detent recess or a detent ramp formed in the rail element. A detent body allows discrete positioning or indexing of the carriage relative to the rail element.

The above object is also solved by a linear guide system comprising a rail element comprising two running surfaces facing each other and a carriage according to one of the embodiments as previously described, wherein the carriage and the rail element are linearly displaceable with respect to each other in and against the pull-out direction, and wherein the first and the second slider are frictionally engaged with one of the running surfaces each.

In an embodiment of the invention, the linear guide system is selected from a group consisting of a pull-out guide, a telescopic rail and a linear guide. When the present application refers to a linear guide system, this term is to be understood in such a general way that it includes not only linear guides in which the carriage is significantly shorter than the rail element and the carriage can only be moved within the length of the rail element, but also linear guides in which the base body of the carriage is so long that it protrudes over the length of the rail element when at least one end position is reached, thus forming a partial extension.

In turn, in an embodiment, the linear guide system according to the invention is itself a component of a more complex linear guide. In one embodiment, the carriage of the linear guide system is connected to a further first rail element of a telescopic rail, so that the carriage cannot perform any relative movement with respect to the further first rail element. In such an embodiment, the telescopic rail also comprises a further second rail element which is displaceably mounted on the further first rail element relative to the further first rail element.

In an embodiment of the invention, the rail element is made at least in sections of metal, in particular of steel or aluminium, or of plastic.

In an embodiment of the invention, wherein the carriage has a detent body and a detent spring in addition to the first and second sliders, the rail element has a detent recess, preferably in one of the two running surfaces, wherein the detent recess is arranged in such a way that the detent body can be engaged in the detent recess.

Further advantages, features and possible applications of the present invention will become apparent from the following description of embodiments and the accompanying figures. In the figures, the same elements are designated with identical reference signs.

FIG. 1 is a side view of a linear guide system according to the invention.

FIG. 2 is a partially transparent side view of the assembled linear guidance system of FIG. 1 with the load supported thereon.

Figure 3:
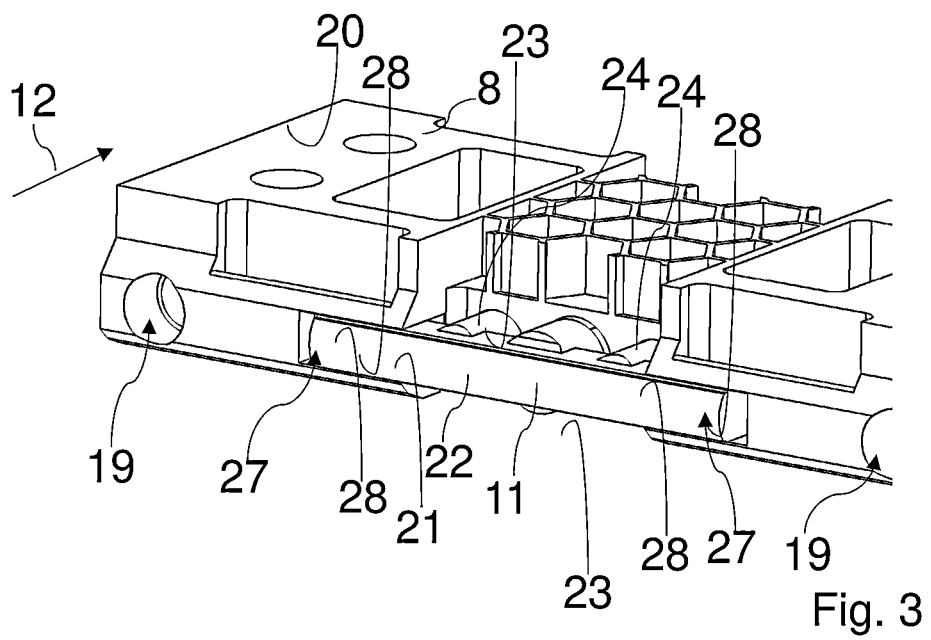
FIG. 3 is a partially broken away isometric view of a carriage for the linear guide system of FIGS. 1 and 2.

All the carriages 1 shown in the figures serve to implement a linear movement along a linear or straight path in a rail element 2. The respective carriage 1 together with the rail element 2 forms a linear guide system in the form of a linear guide 3.

Such a linear guide 3 is shown in the side views of FIGS. 1 and 2. Thereby, each of the carriages 1 can be part of the linear guide 3 in the embodiments described below.

Such a rail element 2 of a linear guide 3 generally has a rail back 4 which connects two legs 5 arranged opposite each other. The legs 5 support the running surfaces (not visible in the figures) of the rail element 2. The legs 5 of the rail element 2 are curved in a part-circle shape, so that overall a roughly C-shaped profile is formed. The carriage 1 is received within the C-shaped profile of the rail element 2, wherein the carriage 1 is supported there by the sliders and support elements described in more detail below, and is thus guided by the running surfaces of the rail element 2.

The carriages 1 are provided for linear movement in and against a pull-out direction 14 on the respective rail element 2. The direction perpendicular to the pull-out direction 14 and substantially parallel to the rail back 4 of the rail element 2 or parallel to the surface 20 of the base body 8 shown in the figures is referred to as the upward direction 12 of the carriage 1 or the rail element 2 or the linear guide 3 as a whole.

Each carriage 1 has a base body 8 which serves as a support for a mobile component 6 which is attached to the base body 8. Such a mobile component 6 is, for example, a drawer which is to undergo a linear extension movement relative to a stationary component 7 to which the rail element is screwed. For this purpose, the base body 8 of the carriage 1 has fastening means, for example internal threads, which can be connected with screws.

Figure 5:
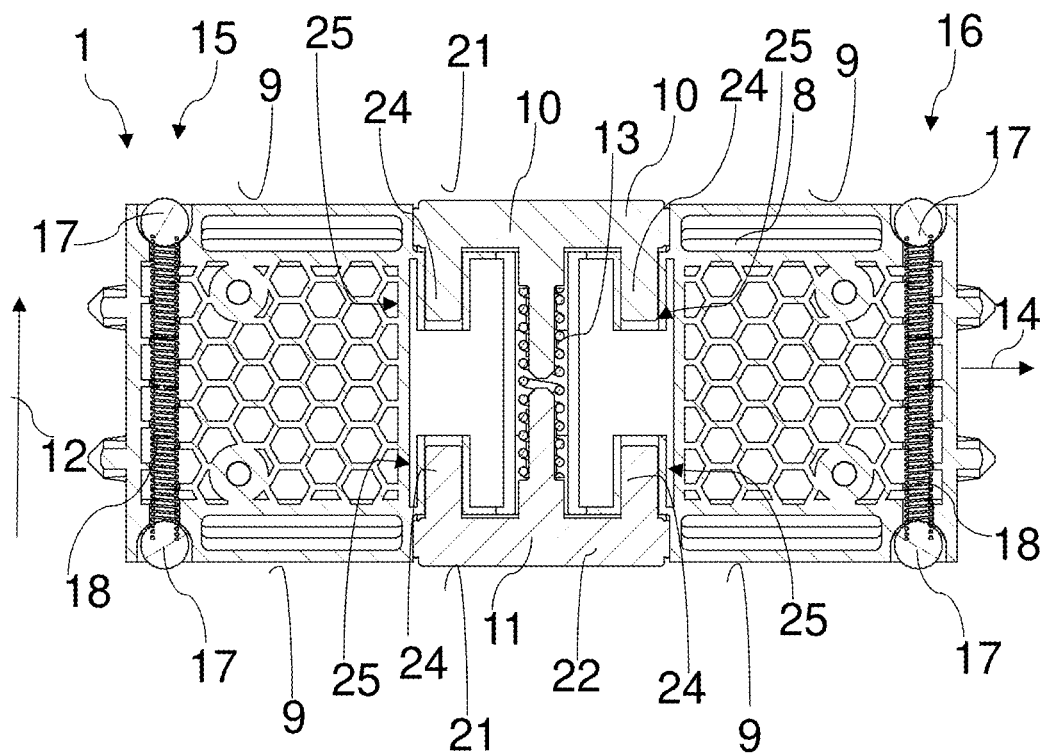
FIG. 5 is a sectional view from above of the carriage in FIG. 4.

The general structure of the carriage 1 can be seen in the sectional view of FIG. 5. In any embodiment, the base body 8 of the carriage 1 has convexly curved guide surfaces 9. These guide surfaces 9 are essentially complementary to the running surfaces of the respective rail element 2. The guide surfaces 9 point away from each other on the two side surfaces of the respective carriage 1. However, the guide surfaces 9 of the base body 8 only serve as emergency running surfaces in the event that the other elements provided for guiding the respective carriage 1 on the base body 8 are loaded beyond an intended extent. Therefore, when the carriage 8 is installed, the guide surfaces 9 of the carriage 8 have a comparatively large clearance with respect to the running surfaces of the respective rail element 2.

The actual guidance of the carriage 1 is provided by a first slider 10 and a second slider 11. The sliders 10, 11 are arranged in pairs and are movably mounted on the base body 8 in the upward direction 12. The first and second sliders 10, 11 are arranged in the centre of the base body 8 in relation to the pull-out direction 14 and symmetrically on the base body 8.

As can be seen from FIG. 5, the first and second sliders 10, 11 are floatingly mounted on the base body in the upward direction 12. This means that the sliders 10, 11 can move freely in the upward direction 12 relative to the base body 8. In doing so, the two sliders 10, 11 are biased away from each other and towards the running surfaces of the rail element 2 by a single coil spring 13. The coil spring 13 is also floatingly mounted on the base body 2 and is supported exclusively on corresponding bearing surfaces on the first and second sliders 10, 11.

Two pairs 15, 16 of support elements are provided on the carriage 1 in all embodiments. In the embodiments shown, these support elements are formed by rolling bodies in the form of bearing balls 17. The bearing balls 17 are arranged symmetrically in front of and behind the first and second sliders 10, 11 in the pull-out direction 14. The bearing balls 17 are each biased away from each other and towards the running surfaces of the rail element 2 by means of a coil spring 18 received on the base body 8. In addition to the first and second sliders 10, 11, these preloaded bearing balls 17 can absorb forces and moments acting on the base body 8 and transfer them via the coil spring 18. For this purpose, the coil springs 18 of the two pairs 15, 16 of support elements are not laid floating in the base body 8, but have a high frictional force against the base body 8. Therefore, the base body 8 transmits the forces and moments acting on it to the balls 17 via the respective coil spring 18. In this way, the balls 17 and their spring elements 18 serve to support the base body 8 in the rail element 2. The ball receptacles 19 of the bearing balls 17 are designed in such a way that the balls have a defined spring travel in the upward direction 12 when springing in against the spring force of the coil springs 18. This limitation of the spring travel due to the design of the ball receptacles 19 in the base body 8 prevents excessive movement of the base body 8 relative to the rail element 2.

Alternatively, the bearing balls 17 may be provided without a resilient bias on the running surfaces of the rail element 2. However, due to the clearance reducing means according to the invention, which block rotational movements of the base body 8 relative to the first and second sliders 10, 11, the additional support elements in the form of bearing balls 17 may be completely omitted in embodiments.

Each of the first and second sliders 10, 11 has a friction jaw 22 with a substantially part-cylindrical sliding surface 21 which is in frictional engagement with the running surfaces of the respective rail element 2. The first and second sliders 10, 11 can perform exclusively a sliding movement along the running surfaces of the rail element 2 both due to the geometric design of their sliding surfaces 21 (these have a shape complementary to the running surfaces of the rail element 2) and due to their mounting and fastening to the base body 8 a rolling movement or a combined rolling/sliding movement is excluded. In addition to the sliding surface 21, the friction jaw 22 comprises two side surfaces 23 running parallel to each other and parallel to the pull-out direction, as well as two end surfaces 37 running parallel to each other and to the upward direction 12. In addition to the friction jaw 22, the first slider or the second slider 10, 11 comprise two guiding pins 24 extending in the upward direction 12. These guiding pins 24 are guided in the base body 8 by guiding bushes 25 complementary to the guiding pins 24. Apart from the guiding pins 24, each of the sliders 10, 11 has a basic T-shaped form, wherein the transverse bar of the sign "T" forms the friction jaw 22, while the vertical part of the "T" engages and guides the coil spring 13.

The first and second sliders 10, 11 are freely movable in the upward direction 12 relative to the base body 8. It has been found that the two first and second sliders 10, 11, which are spring-biased onto the running surfaces of the rail element 2, do not in all cases provide sufficient stability for guiding the base body 8 of the carriage 1, despite the guiding pins 24 running in the guide bushes 25. A conventional carriage 1 often has a clearance, especially with larger dimensions, which has a haptic and acoustic effect on a user.

FIG. 2 schematically shows the horizontal installation of an embodiment of a linear guide 3 between the fixed component 7 and the movable component 6. In this horizontal installation position, the rail back 4 of the rail element 2 runs essentially horizontally. The same applies to the upward direction 12. It is understood that in such an installation position the carriage 2 must primarily transfer torques about an axis of rotation parallel to the upward direction 12 and introduce them into the rail element. Any clearance of the carriage 1 relative to the rail element 2, which leads to a rotary movement about an axis of rotation parallel to the upward direction 12, results in a tilting of the mobile component 6 that may be perceptible to a user. Therefore, in a horizontal installation position, rotary movements about an axis of rotation parallel to the upward direction must primarily be blocked.

If, on the other hand, the linear guide 3 is installed vertically so that the back of the rail 4 is essentially vertically aligned, a rotational movement of the carriage 1 relative to the rail element 2 about an axis of rotation 26 perpendicular to the upward direction 12 and to the pull-out direction 14 will lead to tilting of the load in the form of the mobile component 6 that can be perceived as disadvantageous.

Therefore, in the case of a horizontal installation position, it is primarily important to block a rotational movement of the base body relative to the slider and thus relative to the rail element 2 about an axis of rotation parallel to the upward direction. In the case of a vertical installation position, the primary objective is to block a rotational movement of the base body 8 relative to the first and second sliders 10, 11 about an axis of rotation 26 perpendicular to the upward direction 12 and to the pull-out direction 14.

Therefore, the various embodiments of the present invention each comprise at least one clearance reducing means to block a rotational movement about at least one of said rotational axes.

In the embodiment shown in FIG. 3, the clearance reducing means comprises two guide slots 27 in the base body 8. Each of the guide slots 27 defines two contact surfaces 28 extending parallel to the pull-out direction 14. These contact surfaces 28 of the guide slots 27 are in frictional contact with the side surfaces 23 of the friction jaw 22. Since the friction jaw 22 is longer in the pull-out direction 14 than the distance between the two guiding pins 24 of the slider 10, 11, the clearance reducing means considerably reduces the clearance which the respective slider 10, 11 has with respect to the base body 8. In addition, the contact surfaces 28 of the slots in the base body 8 are such that they extend in the pull-out direction over approximately 20 percent of the total length of the friction jaw 22 in the pull-out direction 14.

Figure 4:
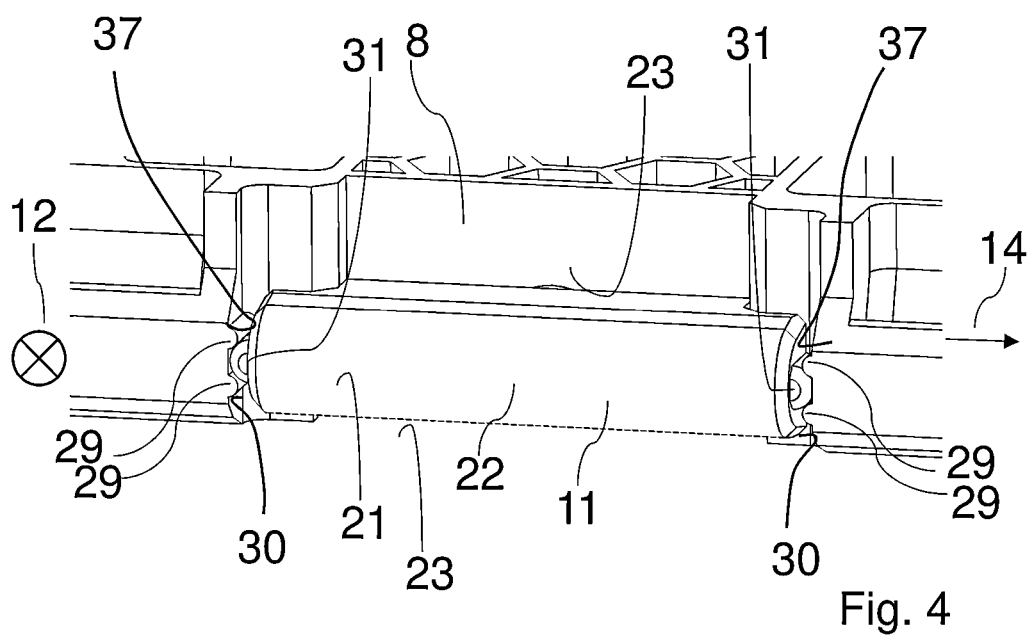
FIG. 4 is a partially broken away isometric representation of a further embodiment of a carriage for the linear guide system from FIGS. 1 and 2.

In the embodiment of the carriage of FIGS. 4 and 5, the clearance reducing means comprises two rail ribs extending in the upward direction 12 on each support surface 30 of the base body 8 facing the end faces 37 of the friction jaw. These rail ribs 29 project from the support surfaces 30 in the pull-out direction 14. The rail ribs 29 have a part-circular area of cross-section in a cross-sectional plane perpendicular to the upward direction 12. In addition, the clearance reducing means in this embodiment comprises a guiding rib 31 also having a part-circular cross-sectional area when viewed in a plane perpendicular to the upward direction 12. The guiding rib 31 and the rail ribs are dimensioned such that the guiding rib only comes into contact with the surfaces of the rail ribs 29, but not with the support surface 30. In this way, a tangential contact extending linearly in the upward direction 12 is formed between the guiding rib 31 on the end surface 37 of the friction jaw 22 and each rail rib. This contact is sufficiently small to allow the slider 10, 11 to still move in the upward direction 12 with substantially little friction. Nevertheless, it keeps the slider 10, 11 free of clearance in a direction 26 perpendicular to the pull-out direction 14 and to the upward direction 12, so that torques about an axis of rotation parallel to the upward direction 12 do not cause the base body 8 to tilt relative to the slider 10, 11.

Figure 6:
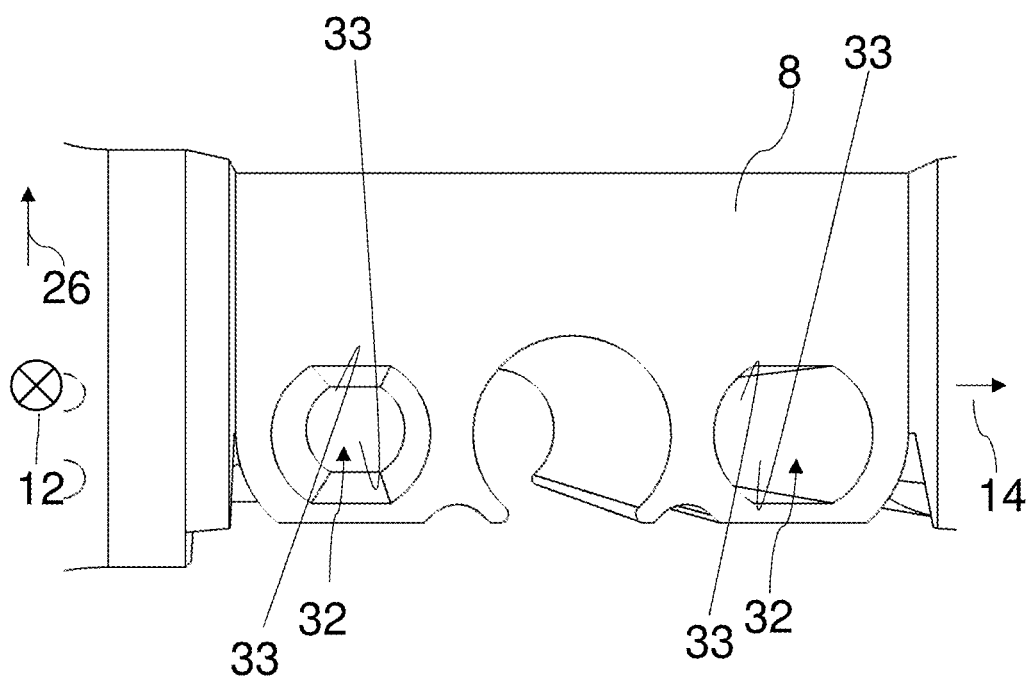
FIG. 6 is an enlarged and partially broken away isometric representation of a further embodiment of the base body of the carriage.

The embodiment of FIG. 6 also shows a clearance reducing means for receiving the slider 10, 11 on the base body 8 without clearance in the direction 26 perpendicular to the pull-out direction 14 and to the upward direction 12. This embodiment thus also blocks rotational movements of the base body 8 relative to the slider 10, 11 about an axis of rotation perpendicular to the upward direction 12. For this purpose, the clearance reducing means in this embodiment is in the form of the smaller spaced boundary surfaces 33 of an elongated hole 32 as a guiding bush for the guiding pins. While the oblong hole has a smaller dimension in the direction 26 perpendicular to the pull-out direction 14 and to the upward direction 12, so that the guiding pin is received in the oblong hole without clearance in this direction, the guiding pin has a clearance relative to the oblong hole 32 in the pull-out direction 14.

Figure 7:
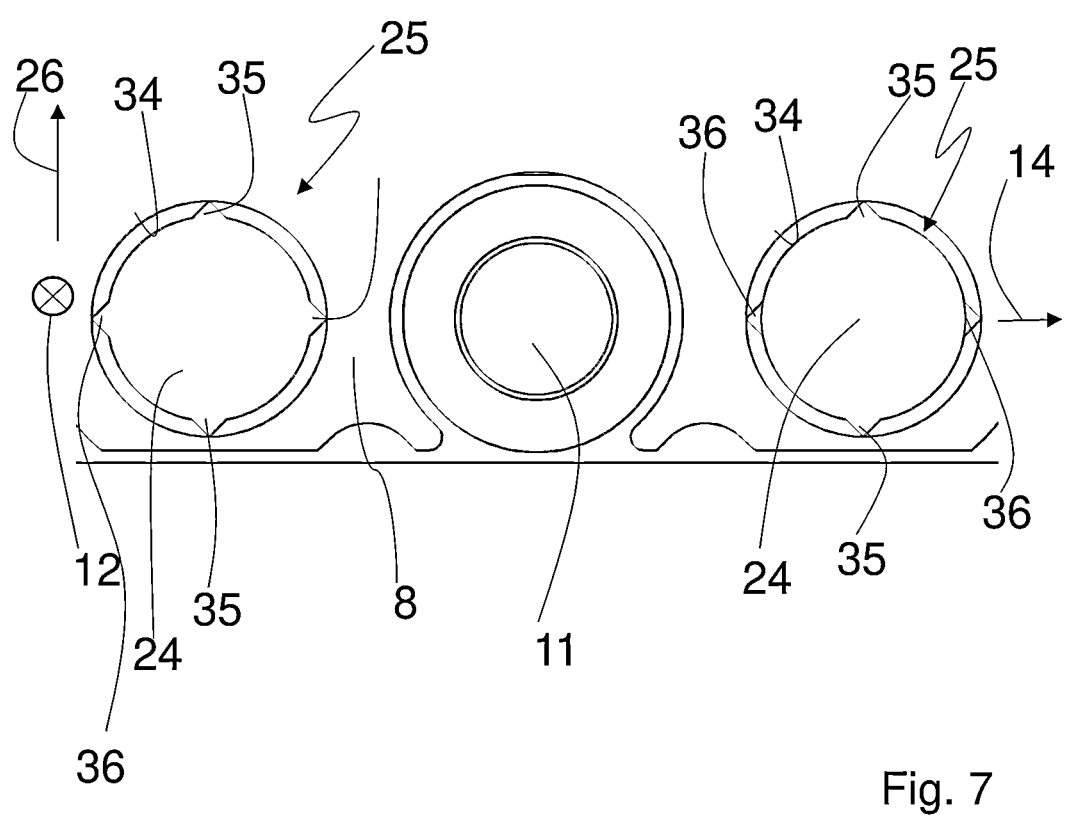
FIG. 7 is a partially broken away side sectional view of an alternative embodiment of the carriage.

In the embodiment of FIG. 7, the clearance reducing means are designed as squeeze webs 35, 36 which are arranged on a surface 34 of the guiding pins 24, project from the surface 34 and extend in the upward direction 12, and which reduce the clearance between the respective guiding pin 24 and the guiding bush 25. The squeeze webs 35, 36 are minimally oversized compared to the diameter of the guiding bush 25 and are elastically deformable due to their selected dimensions.

FIG. 7 shows four squeeze webs 35, 36 on each guiding pin 24, which are arranged diametrically opposite each other in pairs. The squeeze webs designated by the reference sign 36 reduce the clearance between guiding pin 24 and guiding bush 25 in the pull-out direction 14. The squeeze webs designated by the reference sign 35, on the other hand, reduce the clearance between guiding pin 24 and guiding bush 25 in the direction 26 perpendicular to the pull-out direction 14 and the upward direction 12.

Whereas in FIG. 7 both pairs of squeeze webs are shown as an example, in variants thereof only a pair of diametrically opposed squeeze webs will always be provided so that either a rotary movement about an axis of rotation parallel to the upward direction 12 is blocked (then only the squeeze webs 35 are implemented) or a rotary movement about an axis of rotation parallel to the direction 26 is blocked (then only the squeeze webs 36 are implemented). In these variants, no increased friction occurs during a linear movement of the sliders 10, 11 in the upward direction.

For purposes of the original disclosure, it is pointed out that all features as they become apparent to a person skilled in the art from the present description, the drawings and the claims, even if they have been specifically described only in combination with certain further features, can be combined both individually and in any combination with other of the features or groups of features disclosed herein, unless this has been expressly excluded or technical circumstances render such combinations impossible or pointless. A comprehensive, explicit presentation of all conceivable combinations of features is omitted here only for the sake of brevity and readability of the description.

LIST OF REFERENCE SIGNS 1 carriage
2 rail element
3 linear guide
4 rail back
5 leg
6 mobile component
7 stationary component
8 base body
9 guide surface
10 first slider
11 second slider
12 upward direction
13 coil spring
14 pull-out direction
15, 16 pair of support elements
17 bearing ball
18 coil spring
19 ball receptacle
20 surface of base body
21 sliding surface
22 friction jaw
23 side surfaces
24 guiding pins
25 guiding bushes
26 direction perpendicular to upward direction 12 and to pull-out direction 14
27 guide slot 28 contact surfaces
29 rail rib
30 support surface
31 guiding rib
32 oblong hole
33 boundary surface
34 surface of guiding pin
35, 36 squeeze web
37 end face

The invention claimed is:

1. A carriage for a linear guide system, which linear guide system comprises a rail element comprising two running surfaces facing each other and the carriage movable relative to the rail element in and against a pull-out direction, wherein the carriage comprises:
   a base body,
   a pair of first and second sliders having sliding surfaces facing away from each other, wherein the sliding surface of each of the first and second sliders is frictionally engageable with one of the running surfaces, and wherein the first slider is mounted on the base body so as to be movable in an upward direction perpendicular to the pull-out direction relative to the base body, and
   a spring element, wherein the spring element is mounted on the base body in such a way that the spring element biases the first slider in the upward direction away from the second slider,
   wherein at least the base body or the first slider has clearance reducing means,
   wherein the clearance reducing means is designed in such a way that the first slider is mounted substantially free of clearance on the base body, so that at least
   a rotational movement of the base body relative to the first slider about an axis of rotation parallel to the upward direction is blocked by the clearance reducing means
   or
   a rotational movement of the base body relative to the first slider about an axis of rotation perpendicular to the upward direction and to the pull-out direction is blocked by the clearance reducing means.

2. The carriage according to claim 1, wherein the first slider comprises an elongated friction jaw extending in the pull-out direction, and
   wherein the friction jaw comprises two side surfaces extending parallel to the pull-out direction, two end surfaces extending parallel to the upward direction, and the sliding surface.

3. The carriage according to claim 2, wherein the clearance reducing means comprises two guiding slots on the base body, each guiding slot comprising two contact surfaces extending parallel to the pull-out direction and being in frictional contact with the side surfaces of the friction jaw.

4. The carriage according to claim 3, wherein one of the contact surfaces in the pull-out direction is in contact with one of the side surfaces of the friction jaw over a guiding length, wherein the guiding length is at least 20 percent of a total length of the friction jaw in the pull-out direction.

5. The carriage according to claim 2,
   wherein the clearance reducing means comprises two rail ribs extending in the upward direction and one guiding rib extending in the upward direction,
   wherein either the two rail ribs are arranged on one of the end faces of the friction jaw and the guiding rib is arranged on a supporting surface of the base body facing the end face, or the guiding rib is arranged on one of the end faces of the friction jaw and the two rail ribs are arranged on the supporting surface of the base body facing the end face, wherein the guiding rib and the two rail ribs extend parallel to each other, and
   wherein the guiding rib is in contact with the two rail ribs.

6. The carriage according to claim 5, wherein the guiding rib and the two rail ribs each have a part-circular cross-sectional area such that a substantially linear contact is formed between a surface of the guiding rib and each of the surfaces of the two rail ribs.

7. The carriage according to claim 2, wherein at least the base body or the first slider comprises two clearance reducing means, wherein the two clearance reducing means are spaced from each other in the pull-out direction, wherein the spacing is at least 50 percent of a total extension of the friction jaw in the pull-out direction.

8. The carriage according to claim 2, wherein an extension of the friction jaw in the pull-out direction is at least 35 percent of a total extension of the base body in the pull-out direction.

9. The carriage according to claim 1, wherein the first slider comprises an elongate friction jaw extending in the pull-out direction and at least one guiding pin extending from the friction jaw in the upward direction, wherein the guiding pin engages in a guiding bush in the base body which guiding bush is complementary to the guiding pin, so that the first slider is mounted movably in the upward direction relative to the base body.

10. The carriage according to claim 9, wherein the clearance reducing means is formed as an element at least on the at least one guiding pin or on the guiding bush, and
    wherein the element is designed in such a way, that the combination of the guiding pin and the guiding bush either has a smaller clearance in the pull-out direction than in a direction perpendicular to the pull-out direction and to the upward direction or has a smaller clearance in the direction perpendicular to the pull-out direction and the upward direction than in the pull-out direction.

11. The carriage according to claim 10, wherein the element is a squeezing web arranged on a surface of the guiding pin or the guiding bush, projecting with respect to the surface and extending in the upward direction, which reduces the clearance between the guiding pin and the guiding bush.

12. The carriage according to claim 11, wherein the element comprises two squeezing webs arranged on the surface of the guiding pin or of the guiding bush, projecting with respect to the surface and extending in the upward direction.

13. The carriage according to claim 12, wherein the two squeezing webs are arranged diametrically opposite each other on the surface.

14. The carriage according to claim 11, wherein the squeezing web is elastically deformable.

15. The carriage according to claim 1, wherein the carriage comprises a plurality of rolling bodies,
    wherein the plurality of rolling bodies is accommodated on the base body in such a way that the plurality of rolling bodies can roll at least on the two running surfaces or perform a sliding movement relative to the two running surfaces, and in such a way that the plurality of rolling bodies is spaced apart from the first and the second slider in the pull-out direction, and
    wherein the base body determines a position of each of the plurality of rolling bodies in the pull-out direction relative to the base body.

16. A linear guide system comprising:
a rail element having two running surfaces facing each other, and
a carriage according to claim 1,
wherein the carriage and the rail element are linearly displaceable relative to each other in and against the pull-out direction, and
wherein the first and second sliders are each frictionally engaged with one of the running surfaces.

\* \* \* \* \*